US012417756B2

(12) United States Patent
Jha et al.

(10) Patent No.: US 12,417,756 B2
(45) Date of Patent: Sep. 16, 2025

(54) SYSTEMS AND METHODS FOR REAL-TIME ACCENT MIMICKING

(71) Applicant: Sanas.ai Inc., Palo Alto, CA (US)

(72) Inventors: Ankita Jha, Bangalore (IN); Lukas Pfeifenberger, Salzburg (AT); Piotr Dura, Warsaw (PL); David Braude, Edinburgh (GB); Alvaro Escudero, San Sebastian de los Reyes (ES); Shawn Zhang, Palo Alto, CA (US); Maxim Serebryakov, Palo Alto, CA (US); Sharath Kashava Narayana, Palo Alto, CA (US)

(73) Assignee: Sanas.ai Inc., Palo Alto, CA (US)

( * ) Notice: Subject to any disclaimer, the term of this patent is extended or adjusted under 35 U.S.C. 154(b) by 0 days.

(21) Appl. No.: 19/027,799

(22) Filed: Jan. 17, 2025

(65) Prior Publication Data

US 2025/0166603 A1 May 22, 2025

Related U.S. Application Data

(60) Provisional application No. 63/678,180, filed on Aug. 1, 2024.

(51) Int. Cl.
*G10L 15/26* (2006.01)
*G10L 13/027* (2013.01)
*G10L 13/08* (2013.01)

(52) U.S. Cl.
CPC ............ *G10L 13/027* (2013.01); *G10L 13/08* (2013.01)

(58) Field of Classification Search
None
See application file for complete search history.

(56) References Cited

U.S. PATENT DOCUMENTS

| | | | | |
|---|---|---|---|---|
| 9,129,602 | B1 * | 9/2015 | Shepard | G10L 21/013 |
| 9,715,873 | B2 * | 7/2017 | Graham | G10L 13/08 |
| 11,120,219 | B2 * | 9/2021 | Alloh | G10L 15/005 |
| 11,134,217 | B1 * | 9/2021 | Goel | G06V 40/174 |
| 11,600,284 | B2 * | 3/2023 | Pearson | G06N 3/08 |
| 11,741,965 | B1 * | 8/2023 | Opp | G10L 13/086 704/270 |
| 12,039,975 | B2 * | 7/2024 | Krishnan | G10L 15/20 |
| 12,087,270 | B1 * | 9/2024 | Cygert | G10L 13/047 |

(Continued)

*Primary Examiner* — Jakieda R Jackson
(74) *Attorney, Agent, or Firm* — Troutman Pepper Locke LLP

(57) ABSTRACT

The disclosed technology relates to methods, speech processing systems, and non-transitory computer readable media for real-time accent mimicking. In some examples, trained machine learning model(s) are applied to first input audio data to extract accent features of first input speech associated with a first accent of a first user. Obtained second input data associated with second input speech associated with a second accent of a second user is analyzed to generate characteristics specific to a natural voice of the second user. A modified version of the second input speech is synthesized based on the generated characteristics and the extracted accent features. The modified version of the second input speech advantageously preserves aspects of the natural voice of the second user and mimics the first accent. Output audio data generated based on the modified version of the second input speech is provided for output via an audio output device.

20 Claims, 4 Drawing Sheets

(56) References Cited

U.S. PATENT DOCUMENTS

| | | | | |
|---|---|---|---|---|
| 12,243,511 | B1 * | 3/2025 | Joly | G10L 15/26 |
| 2004/0225499 | A1 * | 11/2004 | Wang | G10L 15/26 704/E15.044 |
| 2005/0234727 | A1 * | 10/2005 | Chiu | G10L 15/26 704/E15.044 |
| 2008/0205629 | A1 * | 8/2008 | Basson | H04M 3/5233 379/265.12 |
| 2008/0269958 | A1 * | 10/2008 | Filev | G06N 3/006 701/1 |
| 2014/0187210 | A1 * | 7/2014 | Chang | H04W 4/16 455/414.1 |
| 2016/0140952 | A1 * | 5/2016 | Graham | G10L 13/033 704/260 |
| 2016/0275952 | A1 * | 9/2016 | Kashtan | G10L 17/00 |
| 2017/0169814 | A1 * | 6/2017 | Pashine | G10L 15/06 |
| 2018/0146370 | A1 * | 5/2018 | Krishnaswamy | G10L 19/018 |
| 2018/0203847 | A1 * | 7/2018 | Akkiraju | G06F 16/3329 |
| 2020/0004820 | A1 * | 1/2020 | Chhaya | G06F 40/30 |
| 2020/0193971 | A1 * | 6/2020 | Feinauer | G10L 15/075 |
| 2021/0098013 | A1 * | 4/2021 | Day | H04L 65/764 |
| 2021/0217431 | A1 * | 7/2021 | Pearson | G10L 21/013 |
| 2022/0093094 | A1 * | 3/2022 | Krishnan | G06V 10/40 |
| 2022/0131973 | A1 * | 4/2022 | Talib | H04M 3/2281 |
| 2023/0267941 | A1 * | 8/2023 | Nagpal | G10L 21/007 |
| 2023/0335123 | A1 * | 10/2023 | Liu | G10L 15/04 |
| 2024/0146560 | A1 * | 5/2024 | Swerdlow | H04L 12/1831 |
| 2024/0161764 | A1 * | 5/2024 | Maikhuri | G10L 21/007 |
| 2024/0221719 | A1 * | 7/2024 | Kothari | G10L 15/22 |
| 2025/0118286 | A1 * | 4/2025 | Badlani | G10L 13/033 |

* cited by examiner

SYSTEMS AND METHODS FOR REAL-TIME ACCENT MIMICKING

This application claims priority to U.S. Provisional Patent Application Ser. No. 63/678,180, filed Aug. 1, 2024, which is hereby incorporated herein by reference in its entirety.

FIELD

This technology generally relates to audio analysis and, more particularly, to methods and systems for real-time accent mimicking.

BACKGROUND

Effective communication is a fundamental aspect of human interaction, essential for personal, educational, and professional success. Clarity and understandability of speech are critical to enable speakers to convey their thoughts and listeners to comprehend the intended message accurately. However, regional accents can often create barriers to understanding, especially for individuals who are not familiar with a particular dialect. These barriers can lead to misunderstandings, reduced efficiency in communication, and even social and professional disadvantages.

Language learners, in particular, face significant challenges related to accents. The nuances of pronunciation, intonation, and rhythm in a target language's accent can be difficult to master. Learners often struggle to replicate these nuances, which can hinder their overall pronunciation development. Poor accent replication also can lead to difficulties in being understood by native speakers, impacting the learner's confidence and progression in the language.

Existing technologies have attempted to address accent-related issues through various means. Some of these current technologies focus on static accent conversion, where a user's speech is transformed into a different accent using pre-programmed algorithms. While these static approaches offer some benefits, they lack the dynamic nature required for real-time interactions. Static conversion often results in unnatural-sounding speech and fails to adapt to the changing context of conversations.

In response to the growing need for improved communication clarity, virtual conference platforms have begun incorporating accent conversion features. These solutions typically rely on machine learning models trained on pre-recorded speech data. While this method can enhance understanding to some extent, it struggles to adapt to the nuances and variability of real-time conversations. The reliance on prerecorded data means that these machine learning models may not accurately capture the dynamic features of spontaneous speech, leading to potential inaccuracies and a lack of naturalness in the converted speech.

BRIEF DESCRIPTION OF THE DRAWINGS

The disclosed technology is illustrated by way of example and not limitation in the accompanying figures, in which like references indicate similar elements.

DETAILED DESCRIPTION

Examples described below may be used to provide a method, a device (e.g., non-transitory computer readable medium), an apparatus, and/or a system for real-time accent mimicking. Although the technology has been described with reference to specific examples, various modifications may be made to these examples without departing from the broader spirit and scope of the various embodiments of the technology described and illustrated by way of the examples herein. The disclosed technology includes a speech processing system 100 that aids speakers with accents in adopting listeners' accents, thereby enhancing communication clarity and reducing accent-related barriers, among other advantages explained in detail below.

Figure 1:
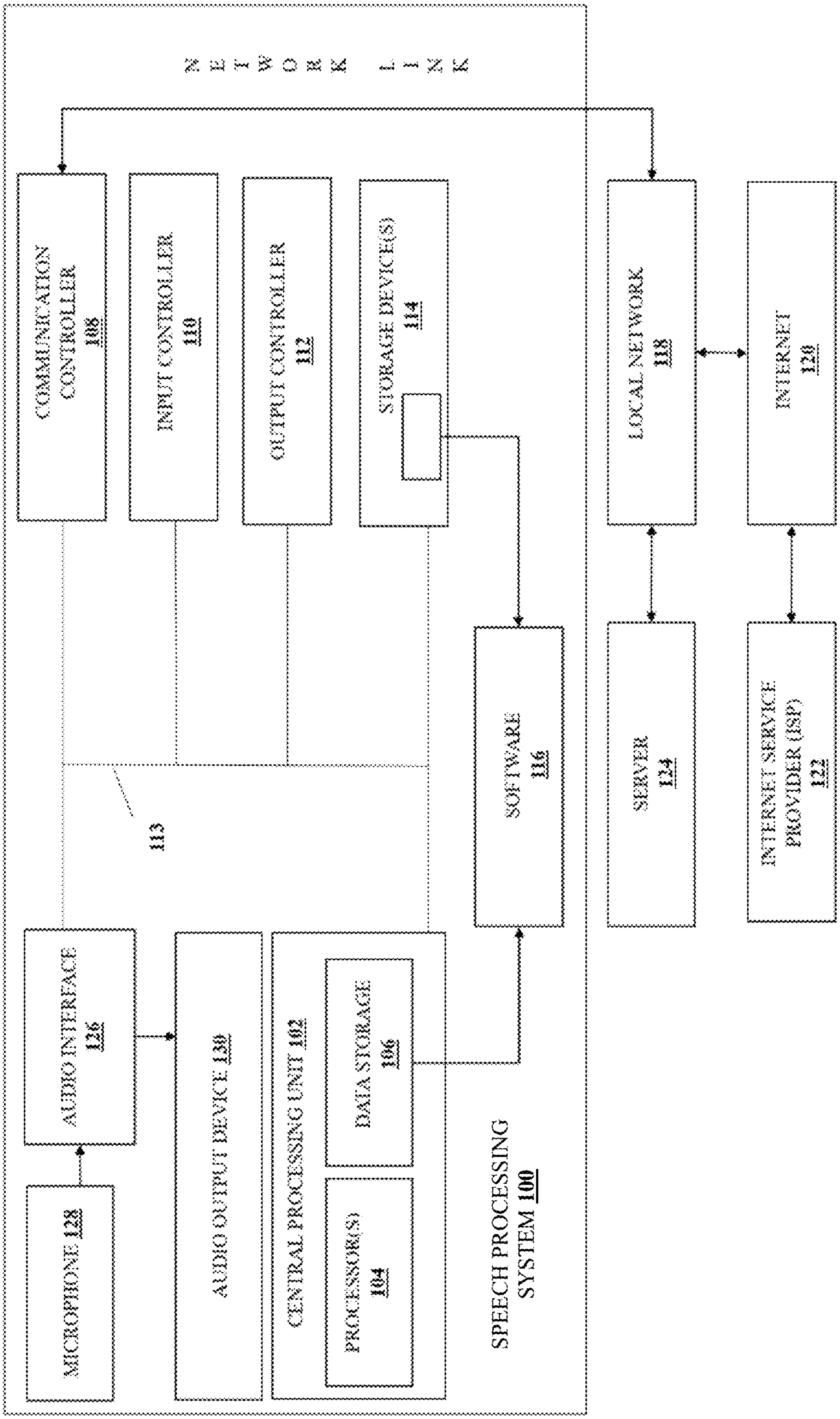
FIG. 1 is a block diagram of an exemplary network environment that includes a speech processing system.

Referring now to FIG. 1, a block diagram of an exemplary network environment that includes a speech processing system 100 is illustrated. The speech processing system 100 in this example includes processor(s) 104, which are designed to process instructions (e.g., computer readable instructions (i.e., code)) stored on the storage device(s) 114 (e.g., a non-transitory computer readable medium) of the speech processing system 100. By processing the stored instructions, the processor(s) 104 may perform the steps and functions disclosed herein, such as with reference to FIG. 3-4, for example.

The speech processing system 100 also includes an operating system and microinstruction code in some examples, one or both of which can be hosted by the storage device(s) 114. The various processes and functions described herein may either be part of the microinstruction code and/or program code (or a combination thereof), which is executed via the operating system. The speech processing system 100 also may have data storage 106, which along with the processor(s) 104 form a central processing unit (CPU) 102, an input controller 110, an output controller 112, and/or a communication controller 108. A bus 113 may operatively couple components of the speech processing system 100, including processor(s) 104, data storage 106, storage device (s) 114, input controller 110, output controller 112, and/or any other devices (e.g., a network controller or a sound controller).

The output controller 112 may be operatively coupled (e.g., via a wired or wireless connection) to a display device (e.g., a monitor, television, mobile device screen, touch-display, etc.) in such a fashion that the output controller 112 can transform the display on the display device (e.g., n response to the execution of module(s)). Input controller 110 may be operatively coupled (e.g., via a wired or wireless connection) to an input device (e.g., mouse, keyboard, touchpad scroll-ball, touch-display, etc.) in such a fashion that input can be received from a user of the speech processing system 100.

The communication controller 108 in some examples provides a two-way coupling through a network link to the Internet 120 that is connected to a local network 118 and operated by an Internet service provider (ISP) 122, which provides data communication services to the Internet 120. The network link typically provides data communication through one or more networks to other data devices. For example, the network link may provide a connection through local network 118 to a host computer and/or to data equipment operated by the ISP 122. A server 124 may transmit requested code for an application through the Internet 120, ISP 122, local network 118, and/or communication controller 108.

The audio interface 126, also referred to as a sound card, includes sound processing hardware and/or software, including a digital-to-analog converter (DAC) and an analog-to-digital converter (ADC). The audio interface 126 is coupled to a physical microphone 128 and an audio output device 130 (e.g., headphones or speaker(s)) in this example, although the audio interface 126 can be coupled to other types of audio devices in other examples. Thus, the audio interface 126 uses the ADC to digitize input analog audio signals from a sound source (e.g., the physical microphone 128) so that the digitized signals can be processed by the speech processing system 100, such as according to the methods described and illustrated herein. The DAC of the audio interface 126 can convert generated digital audio data into an analog format for output via the audio output device 130.

The speech processing system 100 is illustrated in FIG. 1 with all components as separate devices for ease of identification only. One or more of the components of the speech processing system 100 in other examples may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The speech processing system 100 also may be one or more servers, for example a farm of networked or distributed servers, a clustered server environment, or a cloud.

Figure 2:
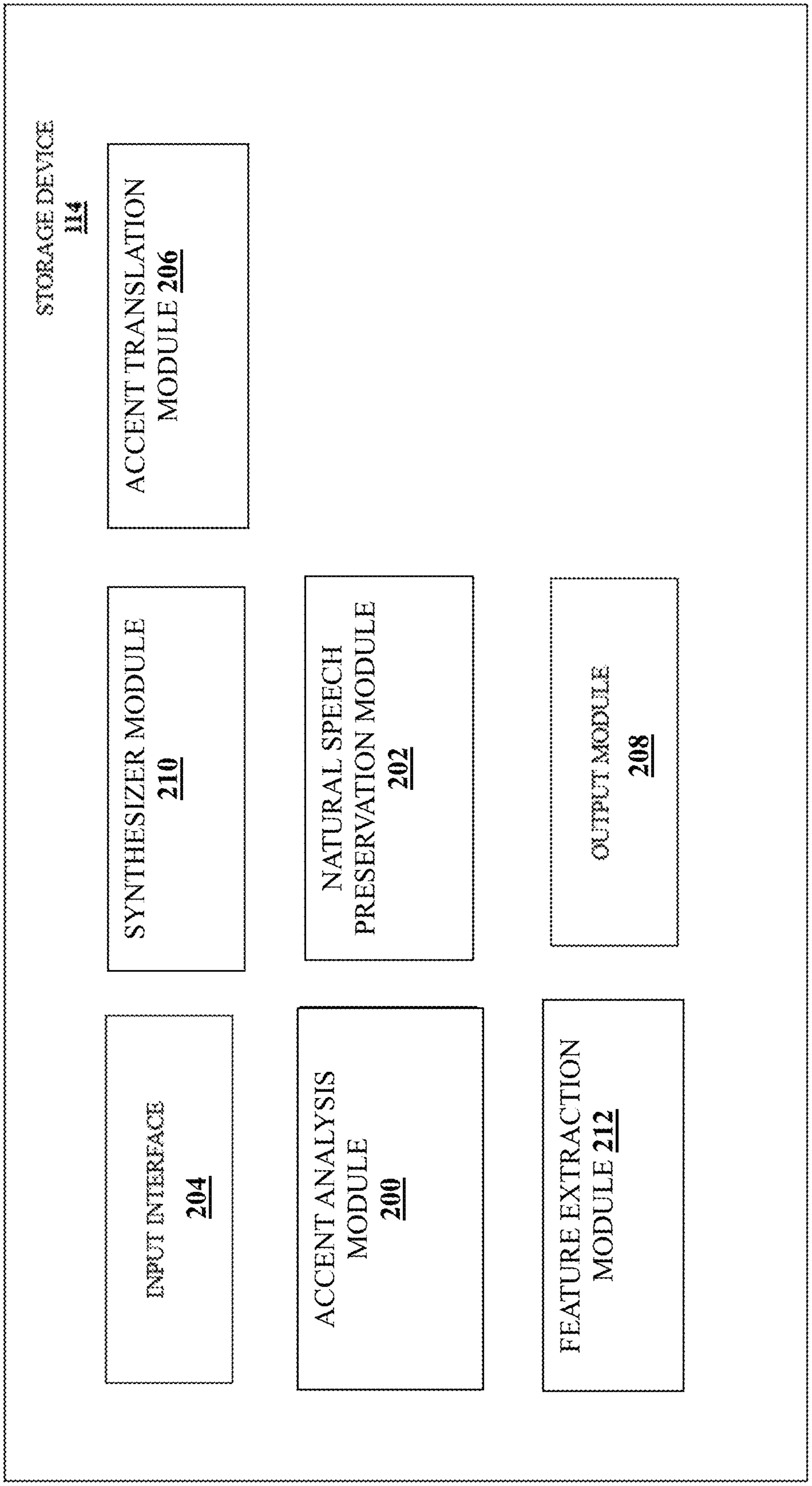
FIG. 2 is a block diagram of an exemplary storage device of the speech processing system of FIG. 1.

Referring now to FIG. 2, a block diagram of an exemplary one of the storage device(s) 114 of the speech processing system 100 is illustrated. The storage device 114 may include an accent analysis module 200, a natural speech preservation module 202, an input interface 204, an accent translation module 206, an output module 208, a synthesizer module 210, and/or a feature extraction module 212, although other types and/or number of modules can also be used in other examples.

The input interface 204 may serve as an interface through which the speech processing system 100 receives input data and may allow for the input of speech and/or audio data or any other representation that captures characteristics of input speech. The input interface 204 may include various components or functionalities to facilitate the input process and may include hardware components such as microphones or audio interfaces for capturing real-time speech data. Alternatively, the input interface 204 may include a software interface that allows for the input of prerecorded speech data or textual representations, and other types of input interfaces can also be used in other examples.

Accordingly, the input interface 204 may facilitate the receipt by the speech processing system 100 of the necessary data to initiate the real-time accent mimicking process described and illustrated herein. The input interface 204 may be the initial point of interaction between a user (e.g., a user computing device) or external systems and the speech processing system 100. The input data provided through the input interface 204 may serve as the foundation for subsequent processing and analysis within the speech processing system 100, as described and illustrated in detail below.

The accent analysis module 200 is configured to analyze input speech from a first user (also referred to herein as first input speech) using machine learning model(s). In some examples, the accent analysis module 200 leverages pre-trained machine learning models to analyze captured first input speech and identify accent-specific features. The machine learning models in this example are trained on diverse speech datasets encompassing a wide range of accents and are adept at recognizing characteristics that distinguish one accent from another.

The analysis by the accent analysis module 200 in some examples focuses on extracting key accent features including pitch contours or variation in pitch throughout the speech, intonation patterns including the rise and fall of pitch at the ends of phrases and sentences, and/or phoneme pronunciations or unique production of phonemes in different accents. These accent features extracted by accent analysis module 200 form a critical component for mimicking a first user's accent in a second user's speech (also referred to herein as second input speech), as explained in more detail below.

The feature extraction module 212 is configured to extract linguistic features, prosodic features (e.g., pitch and timbre), and/or global speaker characteristics from the first input speech. The global speaker characteristics can include vocal timbre, speech rate, articulation style, pitch range, rhythm patterns, and/or accent-specific characteristics. The vocal timbre in some examples is, the unique tonal quality of the speaker's voice, which can differentiate one speaker from another even when saying the same words. For example, a speaker with a warm, resonant timbre versus a speaker with a sharp, nasal timbre.

The speech rate in some examples is the typical speed at which a speaker delivers speech. For instance, a speaker from a fast-paced linguistic environment may average 200 words per minute, while a speaker from a slower-paced environment may average 120 words per minute.

The articulation style is the degree of clarity or slurring in a speaker's pronunciation. For example, some speakers enunciate every syllable clearly, while others may merge sounds, such as saying "gonna" instead of "going to." The pitch range is the range of frequencies commonly used by a speaker. A speaker might naturally use a high-pitched voice with variations between 200-300 Hz, while another might operate in a low-pitched range, varying between 100-150 Hz.

The rhythm patterns refer to the regularity and pattern of pauses, stress, and emphasis in a speaker's speech. For example, a speaker may consistently place emphasis on the first syllable of multisyllabic words or insert long pauses between sentences as part of their natural speaking style. The accent-specific characteristics in some examples include regional or cultural markers that define the speaker's accent. For instance, the tendency to roll the "r" sound in some accents or to flatten certain vowel sounds.

The accent translation module 206 is configured to translate the linguistic features extracted by the feature extraction module 212 from a second accent (of the second input speech) to a first accent (of the first input speech). The first accent in some examples represents the first user's unique way of pronouncing words and structuring sentences.

The synthesizer module 210 is configured to combine the extracted accent features, translated linguistic features, extracted prosodic features, and extracted global speaker characteristics to generate a modified version of the second input speech. The natural speech preservation module 202 is configured to understand the second user's natural speech characteristic(s) and substantially maintain the second user's natural voice during the modification of the second input speech.

In some examples, the natural speech preservation module 202 employs techniques such as a mel frequency cepstral coefficient (MFCC) analysis, to extract a unique fingerprint of a second user's voice, and/or speaker identity encoding, to encode speaker-specific voice characteristics. These techniques are incorporated into the modified version of the second input speech generated using the synthesizer module 210 to allow the speech processing system 100 to maintain a natural sound throughout the process of modifying the second input speech. Thus, the natural speech preservation module 202 advantageously ensures the second user's speech substantially retains its natural quality while mimicking the accent of the first user represented within the first input speech.

The output module 216 optionally facilitates adjustment of speech characteristics, such as speech rate, pitch, or gender, to further customize the representation of the modified version of the second input speech based on user preferences or application requirements, for example. The output module 216 optionally utilizes a vocoder to deliver a seamless and intelligible speech output that reflects the modified version of the second input speech with mimicked accent features. For example, by leveraging the advanced speech techniques described herein, the output module 216 may provide, in real-time or on-demand, a relatively accurate representation of second input speech from a second user in an accent that more closely corresponds to that of a first user.

Figure 3:
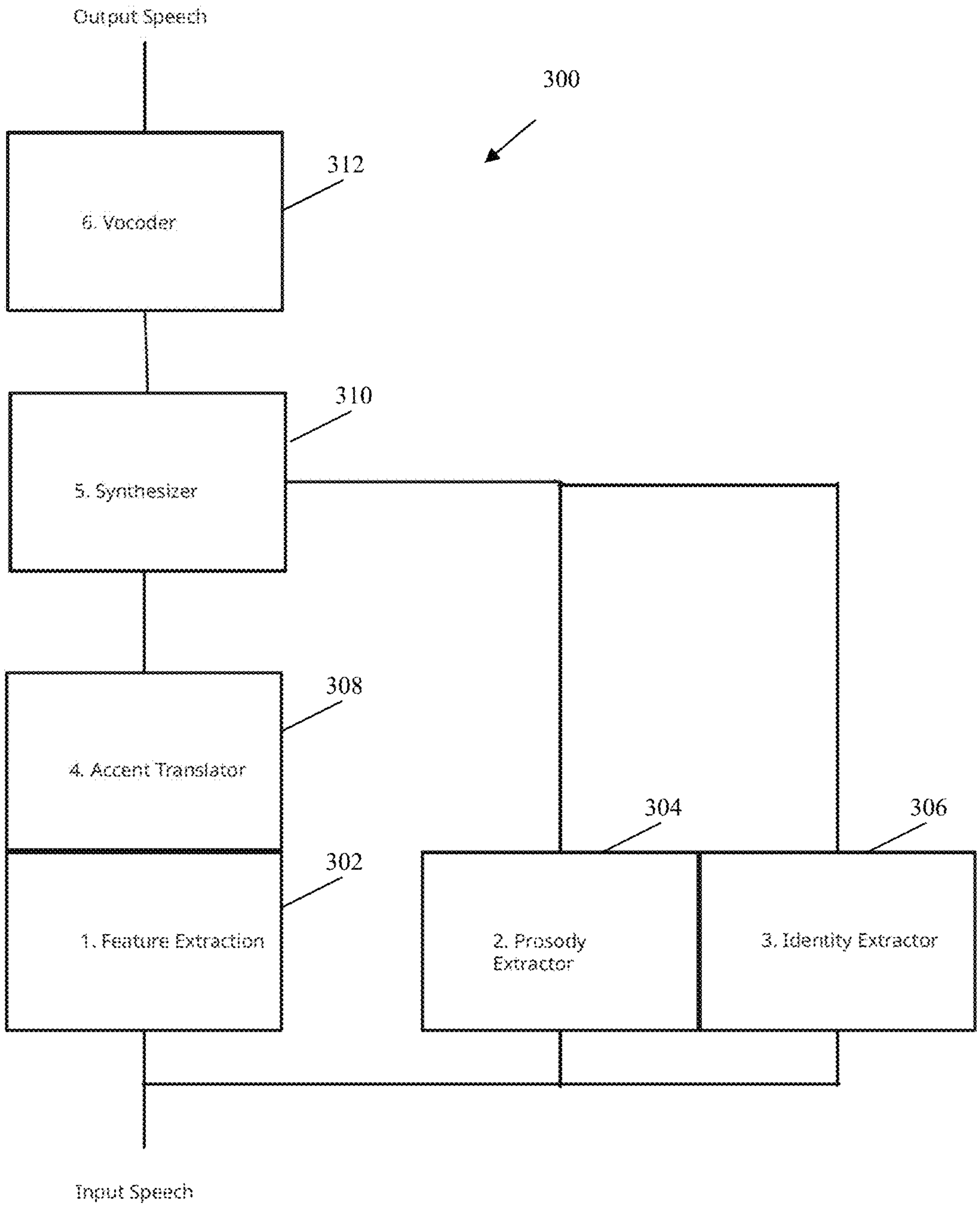
FIG. 3 is a flow diagram of an exemplary method for real-time accent mimicking.

Referring now to FIG. 3, a flow diagram of an exemplary method 300 for real-time accent mimicking is illustrated. In some examples, the method 300 may be implemented as a software application (e.g., software 116 executed by the central processing unit 102) or a module within a larger system that includes the speech processing system 100. The software application or module may receive input audio data, perform accent mimicking operations, and provide an output speech in real-time, as explained in detail below.

Accordingly, in some examples, the steps 302-312 illustrated in FIG. 3 operate on the same device (e.g., a first user computing device and, in other examples, a subset of the steps 302-312 (e.g., the accent translation of step 308 and/or synthesis of step 310) may be executed on a second user computing device or a remote cloud server device, for example. Thus, in the former examples, no external processing is required. However, in the latter examples, the input speech can be transmitted from a first user computing device to a second user computing device, where the accent transformation occurs. The second user computing device in these examples then returns the transformed speech data to the first user computing device or directly outputs the speech to the target listener. Other permutations can also be used in other examples.

Accordingly, in step 302 in some examples, the speech processing system 100 executing at a second user computing device, which may be remotely connected via communication networks to a first user computing device, receives second input audio data (e.g., via microphone and an audio interface) and extracts linguistic features (e.g., phonemes, syllables, word stress, speech rate, and/or pronunciation patterns) from second input speech represented by the second input audio data.

The second input speech is associated with a second user of the second user computing device and a second accent of the second user. Optionally in parallel, the speech processing system 100 extracts prosodic features (e.g., pitch and timbre) from the second input speech in step 304 and global speech characteristics from the second input speech in step 306.

In step 308, the speech processing system 100 translates the linguistic features extracted in step 302 from a second accent associated with the second user to a first accent associated with a first user of the first user computing device. The translation is facilitated by previously obtained accent-specific features. For example, the accent-specific features can be extracted by another speech processing system 100 executed at the first user computing device. The accent-specific features associated with the first accent are captured based on an analysis of first audio data representing first input speech by the first user. The analysis can leverage machine learning model(s) and the accent-specific features can include pitch contours, intonation patterns, and/or phoneme pronunciations, for example, although other accent-specific features can also be used in other examples.

In step 310, the speech processing system 100 combines the translated linguistic features generated in step 308, the prosodic features extracted in step 304, and the global speech characteristics extracted in step 306 to generate a modified version of the second input speech. In some examples, the synthesis in step 310 leverages a unique fingerprint of the second user's voice and/or encoded speaker-specific voice characteristics of the second input speech to thereby substantially maintain the second user's natural voice in the modified second input speech that mimics the first user's first accent.

Accordingly, the synthesis in step 310 modifies the second input speech to mimic the first user's accent while preserving the natural voice characteristics of the second user. In some examples, this is achieved by leveraging a unique voice fingerprint of the second user and/or encoding speaker-specific characteristics, which may include pitch, timbre, and/or rhythm, for example, to ensure the second user's natural voice is substantially maintained. In this way, the modified second input speech retains the second user's identity (or natural voice characteristics), but with the accent of the first user's speech.

In step 312, the speech processing system uses a vocoder to turn the acoustic features of the modified version of the second input speech into output audio data and associated output speech. The output audio data and/or output speech can be sent from the second user computing device via one or more communication networks to the first user device for output via an output audio device (e.g., audio output device 130) of the first user computing device.

In other examples, the input audio data and/or input speech can be sent from the second user computing device via one or more communication networks to the first user computing device and the process illustrated in FIG. 3 can be performed by the speech processing system 100 executed at the first user computing device with the output speech output via an output audio device (e.g., audio output device 130) of the first user computing device. Thus, any of the steps 302-312 can be executed on either of the first or second user computing device in some examples.

Figure 4:
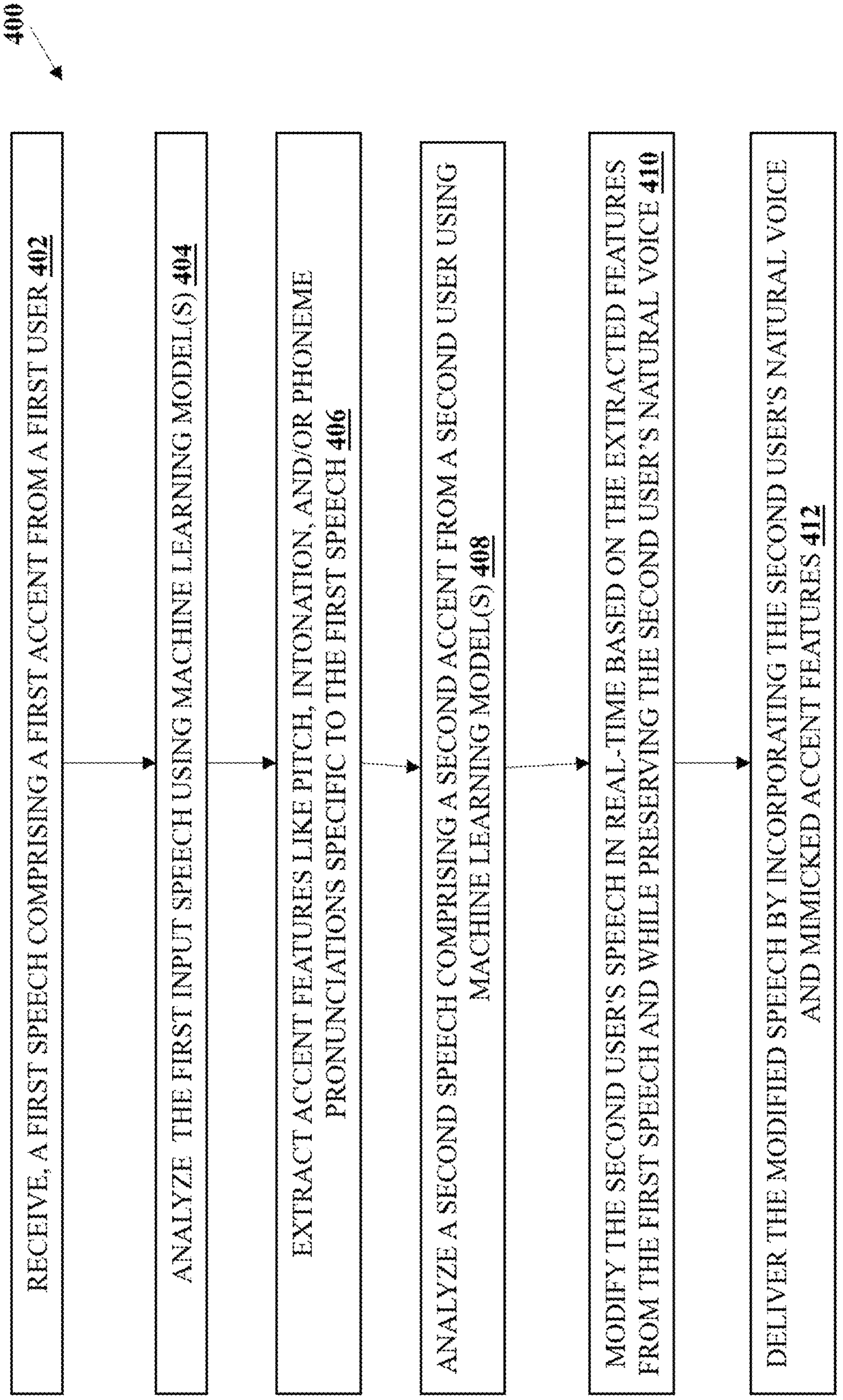
FIG. 4 is a flowchart of an exemplary method for real-time accent mimicking.

Referring now to FIG. 4, a flowchart of an exemplary method 400 for real-time accent mimicking is illustrated. In some examples, the method 400 may be implemented as a software application (e.g., software 116 executed by the central processing unit 102) or a module within a larger system. The software application or module may receive input audio data, perform accent mimicking operations, and provide an output speech in real-time, as explained in detail below In step 402 in some examples, the speech processing system 100 receives first input speech associated with a first accent from a first user. The first input speech can be represented by first input audio data obtained via the audio interface 126 and a microphone 128, for example, although the first input speech can also be obtained over one or more communication networks from another computing device in other examples.

In step 404, the speech processing system 100 analyzes and/or categorizes the first input speech using one or more machine learning models that are trained to recognize accent features that distinguish one accent from another accent. For example, the speech processing system 100 in step 404 may apply the machine learning models to distinguish features such as phonetic variations (e.g., how the speaker produces sounds that differ from another accent (e.g., vowel shifts, consonant articulation)), rhythm and stress patterns as different accents can involve varied speech rhythms and emphasis on certain syllables or words, and/or prosodic features (e.g., patterns in pitch, intonation, and/or cadence that help define accents).

Based on the analysis in step 404, the speech processing system 100 extracts the accent features from the first input speech in step 406. In some examples, the extracted accent features include pitch contours or variation in pitch throughout the speech, intonation patterns including the rise and fall of pitch at the ends of phrases and sentences, and/or phoneme pronunciations or unique production of phonemes in different accents. These extracted accent features facilitate mimicking a first user's accent represented by the first input speech in a second user's speech.

Additionally, in step 406 the speech processing system 100 can transform the identified features into a form that can be used for modifying the second input speech (e.g., to mimic the accent of the first input speech). This transformation can involve encoding the accent features in a way that preserves them while allowing for transformation in the next steps explained in detail below. Alternatively, or in combination, the transformation of step 406 can include normalization or standardization of the features to ensure that they are compatible with the processing pipeline of the speech processing system 100 as described and illustrated by way of the examples herein.

In step 408, the speech processing system 100 analyzes second input speech including a second accent from a second user using the same or one or more different machine learning model(s) as used in step 404 to generate characteristics specific to a natural voice of the second user. In some examples, steps 402-406 can occur at a first user computing device associated with the first user concurrently with steps 408-412 executed at a second user computing device. Thus, one or both of the first or second user computing devices can be separate instantiations of the speech processing system 100 in some examples, with the accent mimicking described and illustrated herein being performed in one or both directions between those user computing devices.

The analysis in step 408 can include applying techniques such as MFCC or speaker identity encoding to the second input speech and/or extracting linguistic, prosodic, and/or global speaker characteristics from the second input speech. An MFCC analysis extracts a unique fingerprint of the second user's voice and a speaker identity encoding encodes speaker-specific voice characteristics of the second input speech. The fingerprint and/or encoding facilitate preservation of a natural sound of the second user's voice represented in the second input speech.

The machine learning model(s) used by the speech processing system 100 in step 408 are designed to identify vocal traits that are distinct to the second user, including phonetic patterns (e.g., the specific sounds they produce), prosodic features (e.g., pitch, tempo, and/or stress patterns), articulation styles, intonation patterns, and/or voice quality (e.g., including timbre and/or resonance). These features collectively contribute to what we recognize as the 'natural voice' of the second user.

The purpose of the analysis in step 408 is to preserve natural voice identity and separate accent from identity. More specifically, the preservation of natural voice identity ensures that while the accent is being modified, the essential characteristics of the second user's natural voice remain intact, which is crucial in preventing the transformed speech from sounding artificial or mismatched with the second user's identity. The separation of accent from identity helps to distinguish between features that pertain to the second user's accent (i.e., the way speech sounds in terms of regional or social variations) and those that pertain to the speaker's inherent voice identity. This separate allows the speech processing system 100 to modify or adjust the accent without altering the second user's unique voice features.

The machine learning model(s) used in step 408 can be trained on large datasets containing a variety of voices and accents, allowing them to recognize subtle differences in how speech is produced. These machine learning model(s) can be trained using supervised learning approaches, where a labeled dataset of various speakers' voice recordings is used to teach the speech processing system 100 how to distinguish between different accents and voice qualities. Other types of, and/or methods for training, the machine learning model(s) can also be used in other examples.

Thus, the machine learning model(s) used in step 408 are configured to output extracted features that define the second user's voice, which can include pitch range and modulation (e.g., how the second user modulates their pitch during speech, which contributes to their unique voice signature), speech rate and rhythm (e.g., how fast or slow the second user speaks and the natural rhythm they follow, formant frequencies (e.g., the resonant frequencies of speech sounds, which help distinguish different accents), vocal timbre and resonance (e.g., the tonal quality of the voice that is unique to the speaker, which can be preserved during accent modification), and/or articulation patterns (e.g., the specific way the second user pronounces consonants and vowels, which is often influenced by their accent and voice mechanics). By analyzing the second input speech using the machine learning model(s), the speech processing system 100 ensures that the features of the second user's natural voice are accurately preserved while adjusting for the desired accent transformation. This process is fundamental to achieving a realistic and personalized speech output that mimics the first user's accent while maintaining the authenticity of the second user's voice.

In step 410, the speech processing system 100 modifies the second user's second input speech in real-time based on the accent features extracted in step 406 from the first input speech and the characteristics specific to the natural voice of the second user generated in step 408. The synthesis in step 410 results in a modified version of the second input speech that preserves the natural quality of the second user's voice while mimicking the accent of the first user.

In step 412, the speech processing system delivers or outputs the modified version of the second input speech via output audio data, such as via the audio interface 126 and the audio output device 130, for example. The methods and systems described and illustrated by way of the examples herein have many practical applications including in virtual conference platforms, language learning applications, accent reduction, immersive gaming and virtual reality experiences, and to provide accessibility for speech impairments.

More specifically, the speech processing system 100 can be integrated into virtual conference platforms to enhance communication clarity by mimicking the accent of the primary speaker. In other examples, the speech processing system 100 can be used to provide real-time feedback to language learners by mimicking the accent of an instructor, helping learners improve their pronunciation and accent replication. The speech processing system 100 also can aid users with strong accents in adopting a listener's accent, enhancing communication clarity and reducing accent-related barriers.

In yet other examples, the speech processing system 100 can be integrated into video games and virtual reality experiences to enhance immersion by adjusting a user's speech to match the accent(s) of in-game characters or environments. Additionally, the speech processing system 100 can be adapted to improve accessibility for users with speech impairments by enhancing clarity and reducing communication barriers. The advantages of this technology can be leveraged in many other use cases and types of deployments.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A speech processing system, comprising an audio interface coupled to a microphone and an audio output device, memory having instructions stored thereon, and one or more processors coupled to the memory and the audio interface and configured to execute the instructions to:

apply one or more trained machine learning models to first input audio data obtained via the microphone and the audio interface to extract accent features of first input speech associated with a first accent of a first user;

analyze obtained second input audio data associated with second input speech associated with a second accent of a second user to generate characteristics specific to a natural voice of the second user, wherein the generated characteristics correspond to vocal traits that are distinct to the second user and comprise one or more of a voice quality or one or more phonetic patterns, prosodic features, articulation styles, or intonation patterns;

synthesize a modified version of the second input speech by modifying the obtained second input audio data based on the generated characteristics and the extracted accent features, wherein the modified version of the second input speech preserves aspects of the natural voice of the second user and mimics the first accent; and provide to the audio interface output audio data for output via the audio output device, wherein the output audio data is generated based on the modified version of the second input speech.

2. The speech processing system of claim 1, wherein the one or more processors are further configured to execute the instructions to extract from the first input audio data one or more prosodic features, linguistic features, or global speaker characteristics.

3. The speech processing system of claim 1, wherein the accent features comprise one or more pitch contours, other intonation patterns, or phoneme pronunciations and the pitch contours comprise variations in pitch throughout the first input speech, the other intonation patterns comprise the rise and fall of pitch at the ends of phrases or sentences, or the phoneme pronunciations comprise a unique production of phonemes in the first accent.

4. The speech processing system of claim 1, wherein the one or more processors are further configured to execute the instructions to apply a mel frequency cepstral coefficient (MFCC) analysis to extract a unique fingerprint of the voice of the second user, wherein the generated characteristics comprise the unique fingerprint.

5. The speech processing system of claim 1, wherein the one or more processors are further configured to execute the instructions to apply a speaker identity encoding technique to encode speaker-specific voice characteristics, wherein the generated characteristics comprise the speaker-specific voice characteristics.

6. The speech processing system of claim 1, wherein the one or more processors are further configured to execute the instructions to receive the second input audio data via one or more communication networks and from a user computing device that is remote from the speech processing system, wherein the second input audio data is captured at the user computing device.

7. A method for real-time accent mimicking, the method implemented by a speech processing system and comprising:

applying one or more trained machine learning models to first input audio data to extract accent features of first input speech associated with a first accent of a first user;

analyzing obtained second input audio data associated with second input speech associated with a second accent of a second user to generate characteristics specific to a natural voice of the second user, wherein the generated characteristics comprise a unique fingerprint of the voice of the second user;

synthesizing a modified version of the second input speech by modifying the obtained second input audio data based on the generated characteristics and the extracted accent features; and providing output audio data generated based on the modified version of the second input speech.

8. The method of claim 7, wherein the modified version of the second input speech preserves aspects of the natural voice of the second user and mimics the first accent.

9. The method of claim 7, further comprising extracting from the first input audio data one or more prosodic features, linguistic features, or global speaker characteristics.

10. The method of claim 7, wherein the accent features comprise one or more pitch contours, intonation patterns, or phoneme pronunciations and the pitch contours comprise variations in pitch throughout the first input speech, the intonation patterns comprise the rise and fall of pitch at the ends of phrases or sentences, or the phoneme pronunciations comprise a unique production of phonemes in the first accent.

11. The method of claim 7, further comprising applying a mel frequency cepstral coefficient (MFCC) analysis to extract the unique fingerprint of the voice of the second user.

12. The method of claim 7, further comprising applying a speaker identity encoding technique to encode speaker-specific voice characteristics, wherein the generated characteristics comprise the speaker-specific voice characteristics.

13. The method of claim 7, further comprising receiving the second input audio data via one or more communication networks and from a user computing device that is remote from the speech processing system, wherein the second input audio data is captured at the user computing device.

14. A non-transitory computer-readable medium comprising instructions that, when executed by at least one processor, cause the at least one processor to:

apply one or more trained machine learning models to first input audio data obtained via a microphone to extract accent features of first input speech associated with a first accent of a first user;

analyze obtained second input audio data associated with second input speech associated with a second accent of a second user to generate characteristics specific to a natural voice of the second user, wherein the generated characteristics comprise speaker-specific voice characteristics;

synthesize a modified version of the second input speech by modifying the obtained second input audio data based on the generated characteristics and the extracted accent features; and provide for output via an audio output device output audio data generated based on the modified version of the second input speech.

15. The non-transitory computer-readable medium of claim 14, wherein the modified version of the second input speech preserves aspects of the natural voice of the second user and mimics the first accent.

16. The non-transitory computer-readable medium of claim 14, wherein the instructions, when executed by the at least one processor further causes the at least one processor to extract from the first input audio data one or more prosodic features, linguistic features, or global speaker characteristics.

17. The non-transitory computer-readable medium of claim 14, wherein the accent features comprise one or more pitch contours, intonation patterns, or phoneme pronunciations and the pitch contours comprise variations in pitch throughout the first input speech, the intonation patterns comprise the rise and fall of pitch at the ends of phrases or sentences, or the phoneme pronunciations comprise a unique production of phonemes in the first accent.

18. The non-transitory computer-readable medium of claim 14, wherein the instructions, when executed by the at least one processor further causes the at least one processor to apply a mel frequency cepstral coefficient (MFCC) analysis to extract a unique fingerprint of the voice of the second user, wherein the generated characteristics comprise the unique fingerprint.

19. The non-transitory computer-readable medium of claim 14, wherein the instructions, when executed by the at least one processor further causes the at least one processor to apply a speaker identity encoding technique to encode the speaker-specific voice characteristics.

20. The non-transitory computer-readable medium of claim 14, wherein the instructions, when executed by the at least one processor further causes the at least one processor to receive the second input audio data via one or more communication networks and from a user computing device that is remote from the speech processing system, wherein the second input audio data is captured at the user computing device.

* * * * *